Patented Dec. 29, 1970

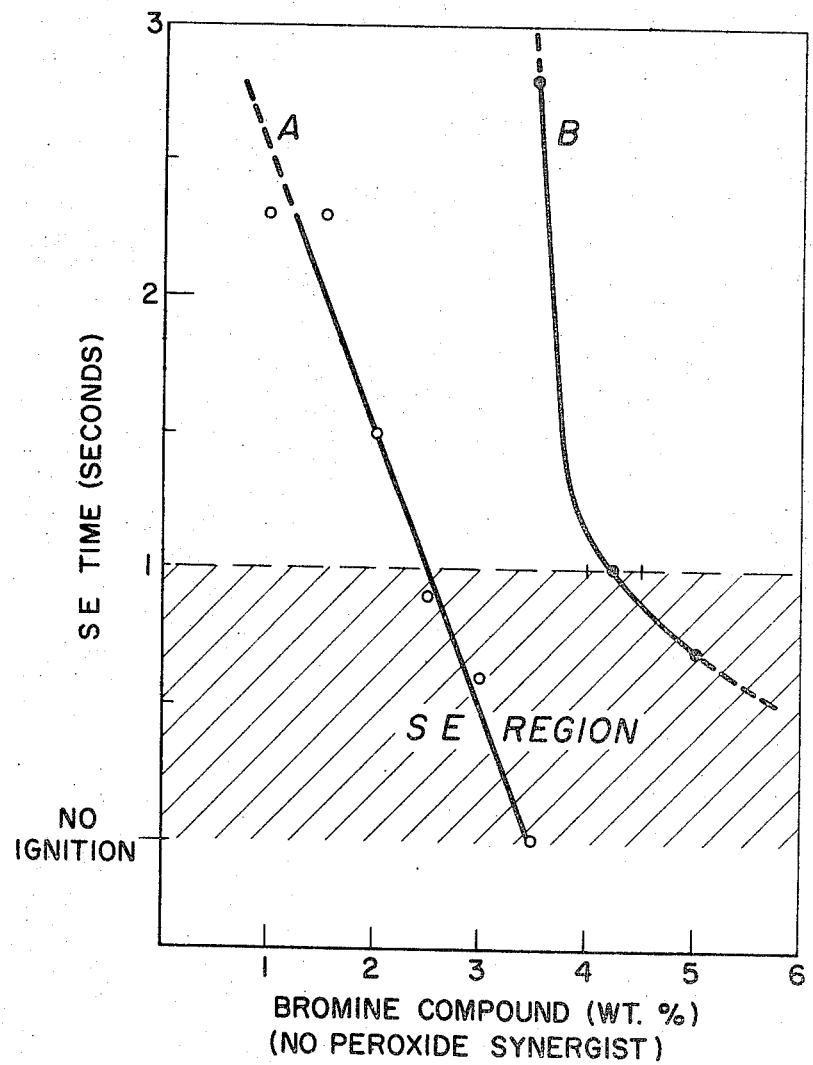

3,551,360
SELF-EXTINGUISHING STYRENE POLYMER COMPOSITIONS
Hans Dressler, Monroeville, Pa., assignor to Koppers Company, Inc., a corporation of Delaware
Filed Sept. 19, 1968, Ser. No. 760,987
Int. Cl. C08f 33/02, 45/60, 47/10
U.S. Cl. 260—2.5          8 Claims

ABSTRACT OF THE DISCLOSURE

Self-extinguishing styrene polymer compositions are formed by incorporating into the styrene polymer from 0.5–10% by weight of specific brominated phenylsulfonyl compounds such as (phenylsulfonyl) dibromoacetonitrile, (phenylsulfonyl) dibromoacetamide, and phenyl tribromomethyl sulfone.

BACKGROUND OF THE INVENTION

Numerous methods for making self-extinguishing polystyrene have been suggested by workers in the art. John J. Tress and William H. Heilman in U.S. 3,050,475 provide a method of making flame-retardant self-extinguishing styrene polymer by direct bromination of the polymer in the presence of an activating agent, such as peroxide. Although the Tress et al. method produces a flame-retardant polymer, difficulties arise because of the corrosion problems attributed to the presence of free bromine or free HBr in the final product. In a series of patents, U.S. 3,058,926, 3,058,927, and 3,058,929 Jacob Eichorn and his coworkers describe the preparation of self-extinguishing polymers by uniformly dispersing throughout the polymer a bromine-containing compound as a flameproofing or flame-retarding agent in combination with a small amount of an organic peroxide as a synergist. It has heretofore been accepted that, by increasing the amount of bromine in a composition, or the percent of bromine in a particular compound used as a self-extinguishing agent, with or without peroxide synergists being present, the polymer containing the increased bromine would have better fire-extinguishing properties. It has now been discovered that, by using certain brominated phenylsulfonyl compounds, excellent fire-extinguishing properties can be had even with an amount of bromine present less than that amount in a conventional self-extinguishing agent such as tris-(2,3-dibromopropyl)phosphate. This increased activity is thought to be attributable to the fact that the brominated phenylsulfonyl compounds are "positive bromine compounds" as hereafter described.

SUMMARY OF THE INVENTION

Self-extinguishing polymer compositions of polystyrene are formed by incorporating into the polystyrene 2.5–10% by weight of a phenylsulfonyl compound of the general formula:

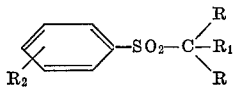

wherein R is bromine, $R_1$ is bromine, cyano, amido, or a nitro group, and $R_2$ can be hydrogen or a lower alkyl group having 1–4 carbon atoms. The amount of phenylsulfonyl compound can be reduced to as low as 0.5 percent if a conventional peroxide synergist is also added to the styrene polymer.

BRIEF DESCRIPTION OF THE DRAWING

The figure graphically illustrates the effectiveness of a compound of the present invention, (phenylsulfonyl) dibromoacetonitrile with a commercially accepted fire-extinguishing agent for polymers, tris-(2,3-dibromopropyl) phosphate. The experiments were made using foam polystyrene as the polymer with no peroxide synergist added to the mixture. The general procedure of Example II was followed. Although a self-extinguishing time of 2 seconds is considered excellent, the demands of present day users have resulted in self-extinguishing times of about one second being desired. As is seen from the figure (phenylsulfonyl) dibromoacetonitrile is much more effective at lower amounts than the conventional self-extinguishing agent to give self-extinguishing times of about one second or lower.

DETAILED DESCRIPTION

Suitable phenylsulfonyl compounds usable in the present invention are those "positive bromine compounds" of the formula:

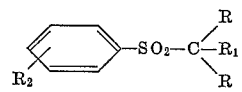

wherein R is bromine, $R_1$ is bromine,

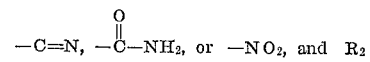

$-C \equiv N$, $-\overset{O}{\underset{\|}{C}}-NH_2$, or $-NO_2$, and $R_2$ is hydrogen or lower alkyl having 1-4 carbon atoms. Included in the above formula are compounds such as (phenylsulfonyl) dibromoacetonitrile, (phenylsulfonyl) dibromoacetamide, phenyl tribromomethyl sulfone, phenyl nitrodobromomethyl sulfone, and the like, and the term phenylsulfonyl compound is used hereinafter to describe the compounds of the above formula.

The term "positive bromine" compounds as used herein describes compounds in which the bromine-bearing carbon atoms is flanked by one or more strong electron-attracting groups, e.g., $-SO_2-$, $-NO_2$, $-CN$, and $-CONH_2$, that make the release of $Br^{\oplus}$ or $Br^{\ominus}$, at least thermally possible. Such compounds provide for (1) less likely hydrolysis; (2) possible generation of Br radical on heating with or without a peroxide synergist present; and (3) possible bactericidal and fungicidal activity in the polymer.

The polymers useful in preparing the self-extinguishing polymer compositions of the present invention are the styrene polymers, including polystyrene, or copolymers of styrene and such monomers as butadiene, alpha-methylstyrene, isobutylene, acrylonitrile, acrylic acid, methacrylic acid, maleic acid and the like.

The amount of phenylsulfonyl compound incorporated into the styrene polymer is the effective amount sufficient to render the polymer self-extinguishing, generally, in amounts of from about 0.5–10% by weight, based on the polymer. Amounts of about 2–2.5% or more by weight of polymer are desired where the phenyl sulfonyl compound is used by itself. When organic peroxide synergists such as dicumylperoxide, 2,5-dimethyl-2,5-di(t-butylperoxy)hexyne-3, di-t-butyl peroxide, and others, such as those disclosed in the previously mentioned Eichorn patents, are used in preparing the self-extinguishing compositions, then, amounts as small as about 0.5% phenylsulfonyl compounds provide excellent results.

While effective in both foam and non-foam polymers, the self-extinguishing agents of the present invention have been found to be particularly useful with expandable polystyrene compositions.

The phenylsulfonyl compound can be incorporated within the polymer by any method which gives uniform distribution of the agent throughout the body of the polymer and which does not cause or result in appreciable deterioration or decomposition of either the polymer or the self-extinguishing agent. Thus, the compound can be incorporated into the polymer by post-impregnation in the polymer particles after polymerization has been completed or alternately the composition can be added to the polymerizing monomer during suspension polymerization.

The polymer particles prepared by suspension polymerization are rendered expandable by incorporating a blowing agent to the particles either during or after the polymerization. Processes for such incorporation are described in Pat. No. 3,192,169 and Pat. No. 2,983,692. Preferred blowing agents include volatile aliphatic hydrocarbons containing from 1–7 carbon atoms in the molecule, i.e., ethane, methane, propane, butane, pentane, isopentane, hexane, heptane, cyclohexane, and their halogenated derivatives which boil at a temperature below the softening point of the polymer. Usually from about 3–20% by weight of the polymer of the blowing agent is incorporated therein.

Generally, the self-extinguishing agents can be incorporated into the polymers by any known technique including addition of the self-extinguishing agent to a polymer melt by mixing in conventional blending equipment and then extruding the melt into self-extinguishing polymer pellets which are in a convenient form for molding.

The self-extinguishing properties of the compositions of the invention are evaluated by forming dry castings of the dense foam from solutions of polystyrene and methyl chloride. Test specimens are made by dissolving 5 g. polystyrene foam particles in 20 ml. of methyl chloride and allowing the solvent to evaporate. The plate-like specimens of dense irregular foam are mounted in a vertical plane throughout the edge and contacted for three seconds with a ½ inch yellow flame of a micro burner, measuring the time for the flame to be extinguished by a stop watch.

Any foam requiring more than 15 seconds for flame-out is considered non-self-extinguishing. A self-extinguishing time of 8–10 seconds is considered poor; 4–8 seconds, fair; 2–4 seconds, good; and below 2 seconds, excellent.

My invention is further illustrated by the following examples wherein parts are parts by weight unless otherwise indicated.

EXAMPLE I

To a solution of 3.7 g. (0.02 m.) of (phenylsulfonyl) acetonitrile in 20 ml. of chloroform was added a solution of 6.4 g. (0.04 m.) of bromine in 20 ml. of chloroform during about 15 minutes. The dark solution was stirred and warmed to 60° C. during 60 minutes and allowed to stand at ambient temperature overnight. The solution was diluted with 100 ml. of cyclohexane which separated an oil. Evaporation of the mixture to dryness gave 6.5 g. (94% yield) of tan solid melting at 85–108° C. Recrystallization from benzene and from isoprorane gave a colorless product melting at 120–122° C. Analysis of the product showed it to be (phenylsulfonyl) dibromoacetonitrile.

EXAMPLE II

Styrene was polymerized in suspension to at least 99.7 percent conversion. The polymer was obtained in the form of spheres, predominantly through 10 to 30 mesh (U.S. sieves). The spheres were impregnated with pentane in aqueous suspension by the method described in U.S. 2,983,692. The expandable particles thus obtained were pre-expanded by steam in the conventional manner. A series of test castings were made by dissolving 5 g. of polystyrene foam particles in 20 ml. of methyl chloride containing various amounts of (phenylsulfonyl) dibromoacetonitrile, and, as indicated in Table I, other additives.

The methyl chloride was allowed to dissolve from the test castings to form coarse, somewhat dense foam discs, about five inches in diameter and one-half inch thick. The discs were mounted in a vertical plane throughout the edge and ignited at the lower edge with a ½ inch flame of a micro burner for five seconds.

The flame source was removed, and the flame allowed to burn until it extinguished itself—the time in excess of the original five seconds being considered the self-extinguishing (SE) time. Test results are shown in Table I.

TABLE I

| Test: | Compound of Example I [1] (wt. percent of polymer) | Additive (wt., percent of polymer) A [2] | B [3] | SE time (seconds) [4] |
|---|---|---|---|---|
| A | 3.0 | | | 1.1 |
| B | 2.0 | | | 1.5 |
| C | 1.0 | | | 2.3 |
| D | 3.5 | | | ([5]) |
| E | 2.0 | 0.5 | | 0.1 |
| F | 5.0 | 0.5 | | Nil |
| G | | 0.5 | 2.0 | 1.0 |
| H | | | 2.0 | 11 |
| I | | | 4.5 | 1.0 |

[1] (Phenysulfonyl) dibromoacetonitrile.
[2] 2,5-di-tert-butylperoxy-2,5-dimethyl hexyne-3.
[3] Tris-(2,3-dibromopropyl) phosphate.
[4] Self-extinguishing time, average of 2–5 ignitions of fresh edge of sample.
[5] Not ignitable.

As seen in Table I (phenylsulfonyl) dibromoacetonitrile is significantly more effective as an SE agent than tris-(2,3-dibromopropyl) phosphate, a conventional brominated self-extinguishing agent, with or without a peroxide synergist present. This is true even though (phenylsulfonyl) dibromoacetonitrile contains only about 47% bromine compared to about 67% bromine in the tris-(2,3-dibromopropyl) phosphate. Comparison of (phenylsulfonyl) dibromoacetonitrile and tris-(2,3-dibromopropyl) phosphate without any peroxide synergist is graphically illustrated in the figure showing that the former can be used without peroxide synergist at only 2.5% to give a self-extinguishing time of one second or less.

EXAMPLE III

To a solution of 22.2 g. (0.12 m.) of (phenylsulfonyl) acetonitrile in 120 ml. of chloroform was added a solution of 38.4 g. (0.24 m.) of bromine in 120 ml. of chloroform during about 15 minutes. The mixture was warmed to 50° C. during 0.5 hour, then allowed to stand overnight at ambient temperature. After the addition of 300 ml. of cyclohexane and evaporation to dryness, 40.8 g. of yellow, semi-solid residue was obtained. Crystallization from isopropanol then from toluene gave 11.1 g. tan solid, M.P. 130–132° C., identified by infra-red and nuclear magnetic resonance as (phenylsulfonyl) dibromoacetamide.

EXAMPLE IV

To a solution of 8.0 g. (0.04 m.) of (phenylsulfonyl) acetic acid, 6.0 g. (0.15 m.) of sodium hydroxide, and 25 ml. of water was added 24 g. (0.15 m.) of bromine in 15 minutes with stirring. The mixture, which exothermed to 80° C., was stirred for 1 hour at ambient temperature, then extracted with 25 ml. of chloroform. The extract was evaporated to dryness to give 10.3 g. of oil. Crystallization from toluene gave 3.4 g. (22% yield) of colorless needles of phenyl tribromomethyl sulfone which, after recrystallization from toluene, had a melting point of 145–146° C.

EXAMPLE V

The compounds prepared in Example III, (phenylsulfonyl) dibromoacetamide and Example IV, phenyl tribromomethyl sulfone, were tested as self-extinguishing agents for polystyrene. The procedure followed was generally that described in Example II, substituting the above compounds for the (phenylsulfonyl) dibromoacetonitrile. The results are listed in Table II.

TABLE II

| Test | Compound of Example III [1] (wt. percent of polymer) | Compound of Example IV [2] (wt. percent of polymer) | Additive [3] (wt. percent of polymer) | SE time (seconds) |
|---|---|---|---|---|
| A | 3.0 | | | 1.8 |
| B | 4.0 | | | 0.9 |
| C | 6.0 | | | [4] |
| D | | 3.0 | | 1.5 |
| E | | 4.0 | | 1.1 |
| F | | 6.0 | | 0.5 |
| G | 5.0 | | 0.5 | 8.3 |
| H | | 5.0 | 0.5 | 1.1 |

[1] (Phenylsulfonyl) dibromoacetamide.
[2] Phenyltribromomethyl sulfone.
[3] 2, 5-di-tert-butylperoxy-2, 5-dimethyl hexyne.
[4] Not ignitable.

What is claimed is:

1. A self-extinguishing polymeric composition comprising a styrene polymer having initially admixed therewith from 0.5–10% by weight of said styrene polymer of phenylsulfonyl compound having the general formula:

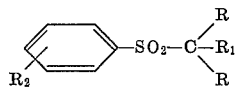

wherein R is bromine, $R_1$ is selected from the group consisting of bromine,

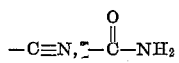

and —NO, and $R_2$ is selected from the group consisting of hydrogen and lower alkyl having 1–4 carbon atoms.

2. The composition of claim 1 wherein said phenylsulfonyl compound is (phenylsulfonyl) dibromoacetonitrile.

3. The composition of claim 1 wherein said phenylsulfonyl compound is (phenylsulfonyl) dibromoacetamide.

4. The composition of claim 1 wherein said phenylsulfonyl compound is phenyl tribromomethyl sulfone.

5. The composition of claim 1 wherein said styrene polymer has a peroxide synergist for said phenylsulfonyl compound added thereto.

6. The composition of claim 5 wherein said peroxide synergist is present in an amount of about 0.1–2% of said polymer.

7. A self-extinguishing expandable polymer of styrene, having been rendered capable of expansion by the incorporation therein of a volatile aliphatic hydrocarbon containing from 1–7 carbon atoms and having dispersed throughout from 0.5–10% of a phenylsulfonyl compound of the formula:

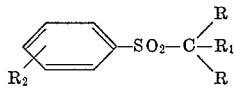

wherein R is bromine, $R_1$ is selected from bromine,

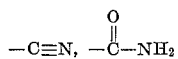

and —$NO_2$ and $R_2$ is selected from hydrogen and a lower alkyl group having 1–4 carbon atoms.

8. The expandable polymer of claim 7 wherein said phenylsulfonyl compound is selected from (phenylsulfonyl) dibromoacetonitrile, (phenylsulfonyl) dibromoacetamide, and phenyl tribromomethyl sulfone.

References Cited

UNITED STATES PATENTS

| 3,058,929 | 10/1962 | Vanderhoff et al. | 260—2.5 |
| 3,067,149 | 12/1962 | Dombrow et al. | 260—45.7 |

FOREIGN PATENTS

| 1,015,028 | 12/1965 | Great Britain. |
| 1,258,080 | 1/1968 | Germany. |

SAMUEL H. BELCH, Primary Examiner

WILBERT J. BRIGGS, SR., Assistant Examiner

U.S. Cl. X.R.

260—45.7, 45.9, 45.95, 465, 556, 558, 607, 647